(12) United States Patent
Gopal et al.

(10) Patent No.: US 8,363,828 B2
(45) Date of Patent: Jan. 29, 2013

(54) DIFFUSION AND CRYPTOGRAPHIC-RELATED OPERATIONS

(75) Inventors: Vinodh Gopal, Westborough, MA (US); Kirk Yap, Framingham, MA (US); Gilbert Wolrich, Framingham, MA (US); Wajdi Feghali, Boston, MA (US); Robert Ottavi, Brookline, NH (US); Sean Gulley, Westwood, MA (US)

(73) Assignee: Intel Corporation, Santa Clara, CA (US)

( * ) Notice: Subject to any disclaimer, the term of this patent is extended or adjusted under 35 U.S.C. 154(b) by 532 days.

(21) Appl. No.: 12/368,196

(22) Filed: Feb. 9, 2009

(65) Prior Publication Data

US 2010/0205455 A1    Aug. 12, 2010

(51) Int. Cl.
*G06F 21/00*    (2006.01)
(52) U.S. Cl. .............................. 380/28; 713/189; 380/29
(58) Field of Classification Search ..................... 380/28, 380/29, 30
See application file for complete search history.

(56) References Cited

U.S. PATENT DOCUMENTS

| 2007/0058806 | A1* | 3/2007 | Ferguson | 380/42 |
| 2007/0192547 | A1 | 8/2007 | Feghali et al. | |
| 2009/0022310 | A1* | 1/2009 | Robshaw | 380/28 |
| 2010/0002872 | A1* | 1/2010 | Shibutani et al. | 380/28 |
| 2010/0091991 | A1* | 4/2010 | Shibutani et al. | 380/259 |

FOREIGN PATENT DOCUMENTS

| WO | WO/2008/026623 | * | 6/2008 |
| WO | WO2008026624 | * | 6/2008 |

OTHER PUBLICATIONS

Advanced Encryption Standard (AES) Federal Information, Processing Standard Publication 197 "Block cipher mode of operation" ,http://en.wikipedia.org/wiki/Block_cipher_modes_of operation, 1-11 pgs.*
Frguson,N."AES-CBC + Elephant diffuser—A Disk Encryption Algorithm for Windows Vista", niels@microsoft "Confusion and Diffusion", http:/en.wikipedia.org/wiki/Confusion_and_ diffusion.*
Dworkin,M "Recomandation for Black Cipher Modes of Operation",Methods and Techniques,NIST Special Publication800- 38A, (Dec. 2001), 1-66 Pages.*
Franklin,S. et Al., "The AES-CBC Cipher Algorithm and its Use with IPsec",Network Working Group,(Sep. 2003),1-15 pgs.*

(Continued)

*Primary Examiner* — Jung Kim
*Assistant Examiner* — Ghodrat Jamshidi
(74) *Attorney, Agent, or Firm* — Christopher K. Gagne (57) ABSTRACT

An embodiment includes at least one processing unit to perform at least first and second sets of diffusion-related operations to produce a resulting block from a data block, and that includes at least one stage and at least one other stage. The at least one stage is to select one of first operands and second operands input to the at least one other stage. The first and second operands are respectively associated with the first and second sets of operations, respectively. The at least one other stage involves arithmetic and logical operations common to both the first and second sets of operations. At least one other processing unit is to perform at least one set of cryptographic-related operations (different, at least in part, from the first and second sets of operations) on at least one of (1) another block to produce the data block and (2) the resulting block.

12 Claims, 3 Drawing Sheets

OTHER PUBLICATIONS

Advanced Encryption Standard (AES), Federal Information, Processing Standard Publication 197 "Block cipher mode of operation",http://en.wikipedia.org/wiki/Block_cipher_modes_of_operation, 1-11 pgs.*

Ferguson, N. "AES-CBC + Elephant diffuser—A Disk Encryption Algorithm for Windows Vista", niels@microsoft.com, (Aug. 2006), 1-22 pgs.

Dworkin, M. "Recommendation for Block Cipher Modes of Operation", Methods and Techniques, NIST Special Publication 800-38A, (Dec. 2001), 1-66 pgs.

Frankel, S. et al., "The AES-CBC Cipher Algorithm and Its Use with IPsec", Network Working Group, (Sep. 2003), 1-15 pgs.

"Advanced Encryption Standard (AES)", Federal Information, Processing Standards Publication 197, (Nov. 26, 2001), 1-51 pgs.

"Confusion and Diffusion", http://en.wikipedia.org/wiki/Confusion_and_diffusion, 1-2 pgs.

"Block cipher modes of operation", http://en.wikipedia.org/wiki/Block_cipher_modes_of_operation, 1-11 pgs.

* cited by examiner

DIFFUSION AND CRYPTOGRAPHIC-RELATED OPERATIONS

FIELD

This disclosure relates to diffusion and cryptographic-related operations.

BACKGROUND

In one conventional arrangement, data is encrypted and stored in a hard disk. After being stored in the disk, the data may be retrieved and decrypted. In order to improve data security, the data also may be diffused before being encrypted, and after being retrieved from the disk and decrypted, an inverse operation may be applied to reverse the diffusion. In this conventional arrangement, the operations to carry out the encryption, decryption, diffusion, and to reverse the diffusion may consume significant processing bandwidth, especially if performed in whole or substantial part by software and/or general purpose hardware.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
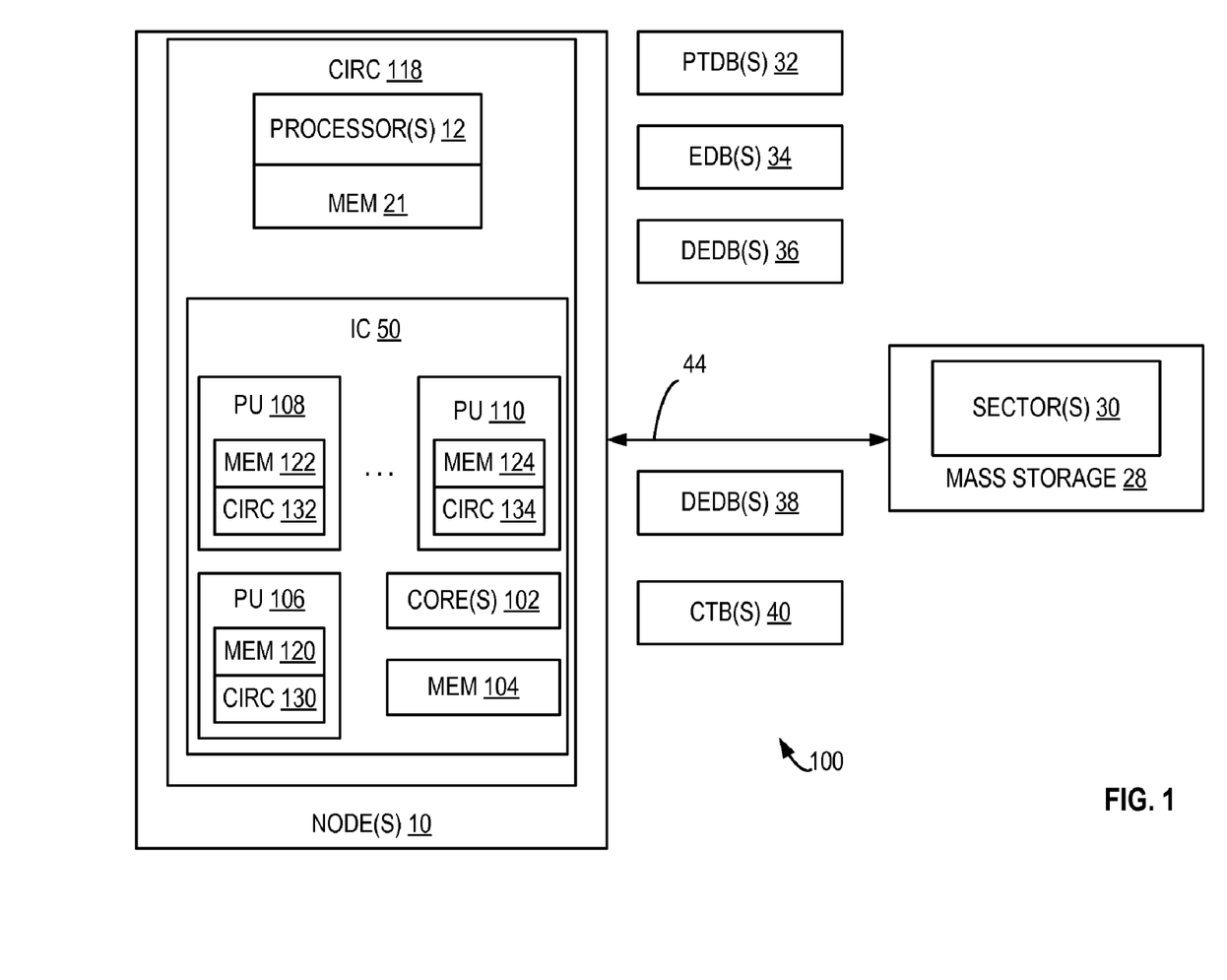
FIG. 1 illustrates a system embodiment.

FIG. 1 illustrates a system embodiment 100. System 100 may include one or more network nodes 10 that may be communicatively coupled via one or more wireless and/or wired communication links 44 to mass storage 28. Of course, without departing from this embodiment, mass storage 28 may be replaced by other and/or addition elements, such as, for example, one or more other nodes (not shown). In this embodiment, a "network node" or "node" may be used interchangeably to mean an entity communicatively coupled in and/or to a network, such as, for example, an end station, appliance, mass storage, intermediate station, network interface, client, server, and/or portion thereof. In this embodiment, a "network" may be or comprise two or more nodes that are communicatively coupled together. Also in this embodiment, a node may be "communicatively coupled" to another node if the one node is capable of transmitting to and/or receiving from the other node one or more commands and/or data. As used herein, a "wireless communication link" means any modality, and/or portion thereof, that permits, at least in part, at least two nodes to be wirelessly communicatively coupled, at least in part. Also as used herein, a "wired communication link" means any modality and/or portion thereof, that permits, at least in part, at least two nodes to be communicatively coupled, at least in part, via non-wireless means, at least in part. As used herein, data may be or comprise one or more commands, and/or one or more commands may be or comprise data.

As used herein, "storage" may mean one or more apparatus into, and/or from which, data may be stored and/or retrieved, respectively. Also as used in herein, the terms "mass storage" and "mass storage device" may be used interchangeably to mean storage capable of non-volatile storage of data. Additionally herein, the terms "disk," "mass storage disk" and "mass storage disk device" may be used interchangeably to mean mass storage that comprises one or more disks and/or one or more platters, and/or one or more surfaces to and/or on which data may stored and/or from which data may be retrieved. For example, in this embodiment, mass storage 28 may comprise, without limitation, one or more not shown mass storage disk devices (such as, non-volatile magnetic and/or optical disk storage devices, such as, one or more hard disk devices) and/or one or more not shown solid state (e.g., flash memory) mass storage devices. As used herein, "circuitry" may comprise, for example, singly or in any combination, analog circuitry, digital circuitry, hardwired circuitry, programmable circuitry, state machine circuitry, and/or memory that may comprise program instructions that may be executed by programmable circuitry.

In this embodiment, as shown in FIG. 1, one or more nodes 10 may comprise operative circuitry 118. Circuitry 118 may comprise one or more host processors 12, computer-readable/writable memory 21, and integrated circuit chip ("IC") 50. In this embodiment, IC 50 may be or comprise a single semiconductor substrate, microelectronic device, and/or die, although many variations are possible without departing from this embodiment; for example, IC 50 may comprise multiple such semiconductor substrates, microelectronic devices, and/or die, without departing from this embodiment.

Each of the host processors 12 may be coupled to computer-readable/writable memory 21 via a not shown memory hub system. Each of the one or more host processors 12 may comprise, for example, a respective Intel® microprocessor (and/or chipset) that is commercially available from the Assignee of the subject application. As used herein, the terms "processor," "processor core," and "processing unit" may be used interchangeably to mean circuitry capable of performing, at least in part, one or more arithmetic and/or logical operations. Of course, alternatively, each of the host processors 12 may comprise, for example, a respective microprocessor (and/or chipset) that is manufactured and/or commercially available from a source other than the Assignee of the subject application, without departing from this embodiment. One or more nodes 10 also may comprise a not shown user interface system may comprise, e.g., a keyboard, pointing device, and display system that may permit a human user to input commands to, and monitor the operation of, system 100. Operative circuitry 118 may be communicatively coupled to mass storage 28 via one or more links 44.

IC 50 may comprise one or more processor cores 102, memory 104, and a plurality of processing units 106, 108, ... 110. In this embodiment, each of the processing units 106, 108, ... 110 may comprise respective arithmetic and logic circuitry 130, 132, ... 134, as well as, respective computer-readable/writable memory 120, 122, ... 124. Alternatively, without departing from this embodiment, one or more of the memories 21, 104, 120, 122, and/or 124 may be eliminated and/or combined with one or more of the other memories in system 100. Also alternatively (or additionally), some or all of the circuitry comprised in host processor 12 and/or IC 50 may be comprised in one or more integrated circuits (not shown) that may be comprised in, for example, one or more (not shown) integrated circuit chips.

One or more machine-readable program instructions may be stored in computer-readable/writable memory 21, 104, 120, 122, and/or 124. In operation of one or more nodes 10, these instructions may be accessed and executed by one or more host processors 12, one or more cores 102, one or more of the processing units 106, 108, . . . 110, and/or one or more of the circuitry 130, 132, . . . 134. When executed by one or more host processors 12, one or more cores 102, one or more of the processing units 106, 108, . . . 110, and/or one or more of the circuitry 130, 132, . . . 134, these one or more instructions may result in operative circuitry 118, host processor 12, one or more cores 102, one or more of the processing units 106, 108, . . . 110, and/or one or more of the circuitry 130, 132, . . . 134 performing the operations described herein as being performed by operative circuitry 118, host processor 12, one or more cores 102, one or more of the processing units 106, 108, . . . 110, and/or one or more of the circuitry 130, 132, . . . 134. One or more of the computer-readable/writable memory 21, 104, 120, 122, and/or 124 may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory.

One or more communication links 44 may be compatible with one or more communication protocols, and circuitry 118 may exchange data and/or commands with mass storage 28 via links 44, in accordance with these one or more communication protocols. For example, in this embodiment, one or more links 44 may be compatible with, and the respective operative circuitry 118 may exchange data and/or commands with mass storage 44 in accordance with, e.g., an Ethernet protocol, Transmission Control Protocol/Internet Protocol (TCP/IP) protocol, Small Computer Systems Interface (SCSI) protocol, and/or Internet Small Computer Systems Interface (iSCSI) protocol.

The Ethernet protocol utilized in system 100 may comply or be compatible with the protocol described in Institute of Electrical and Electronics Engineers, Inc. (IEEE) Std. 802.3, 2000 Edition, published on Oct. 20, 2000. Alternatively or additionally, the TCP/IP protocol utilized in system 100 may comply or be compatible with the protocols described in Internet Engineering Task Force (IETF) Request For Comments (RFC) 791 and 793, published September 1981. The SCSI protocol that may be utilized in system 100 may be compatible with the protocol described in American National Standards Institute (ANSI) Small Computer Systems Interface-2 (SCSI-2) ANSI X3.131-1994 Specification. The iSCSI protocol that may be utilized in system 100 may be compatible with the protocol described in IETF RFC 3720, published April 2004, and/or other and/or later-developed versions of this protocol. Of course, many different communication protocols may be used for such data and/or command exchange without departing from this embodiment.

Figure 2:
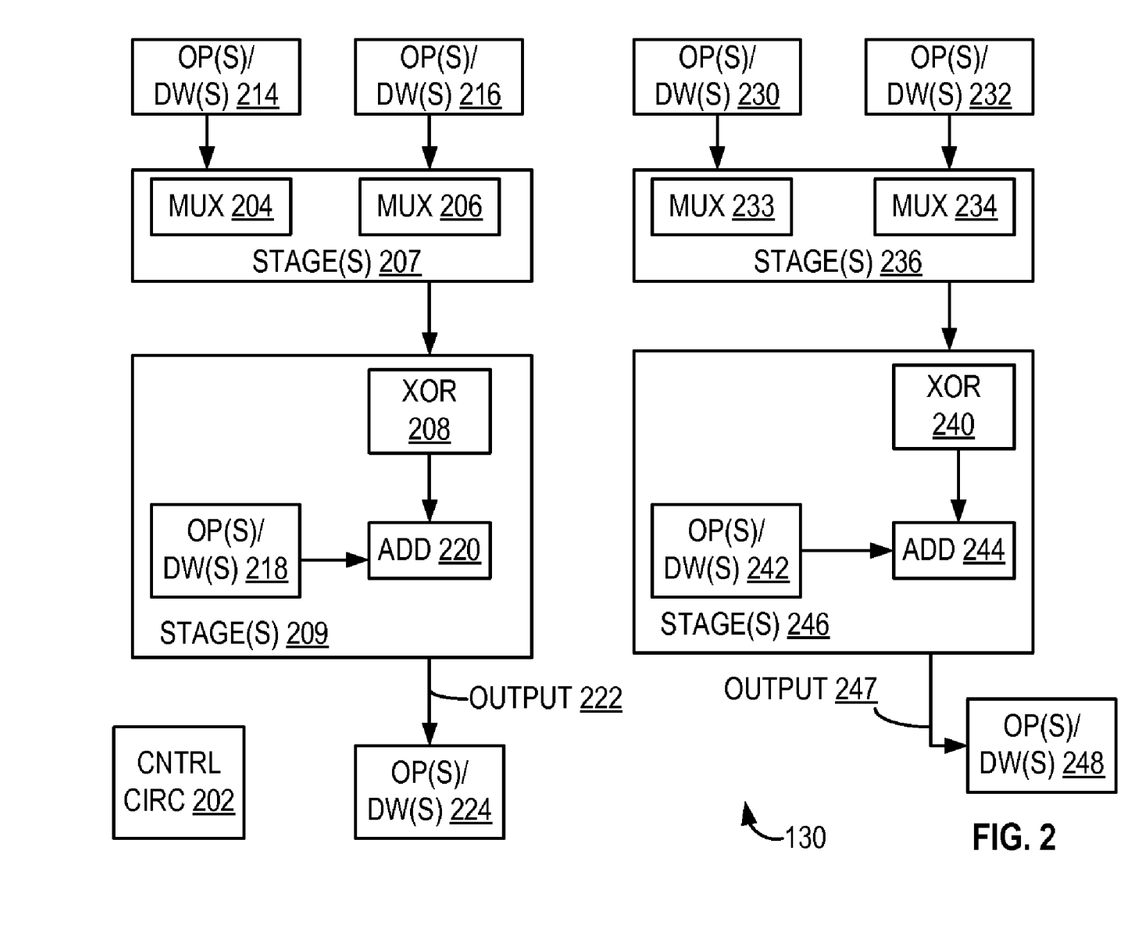
FIG. 2 illustrates circuitry that may be comprised in a processing unit in an embodiment.
Figure 3:
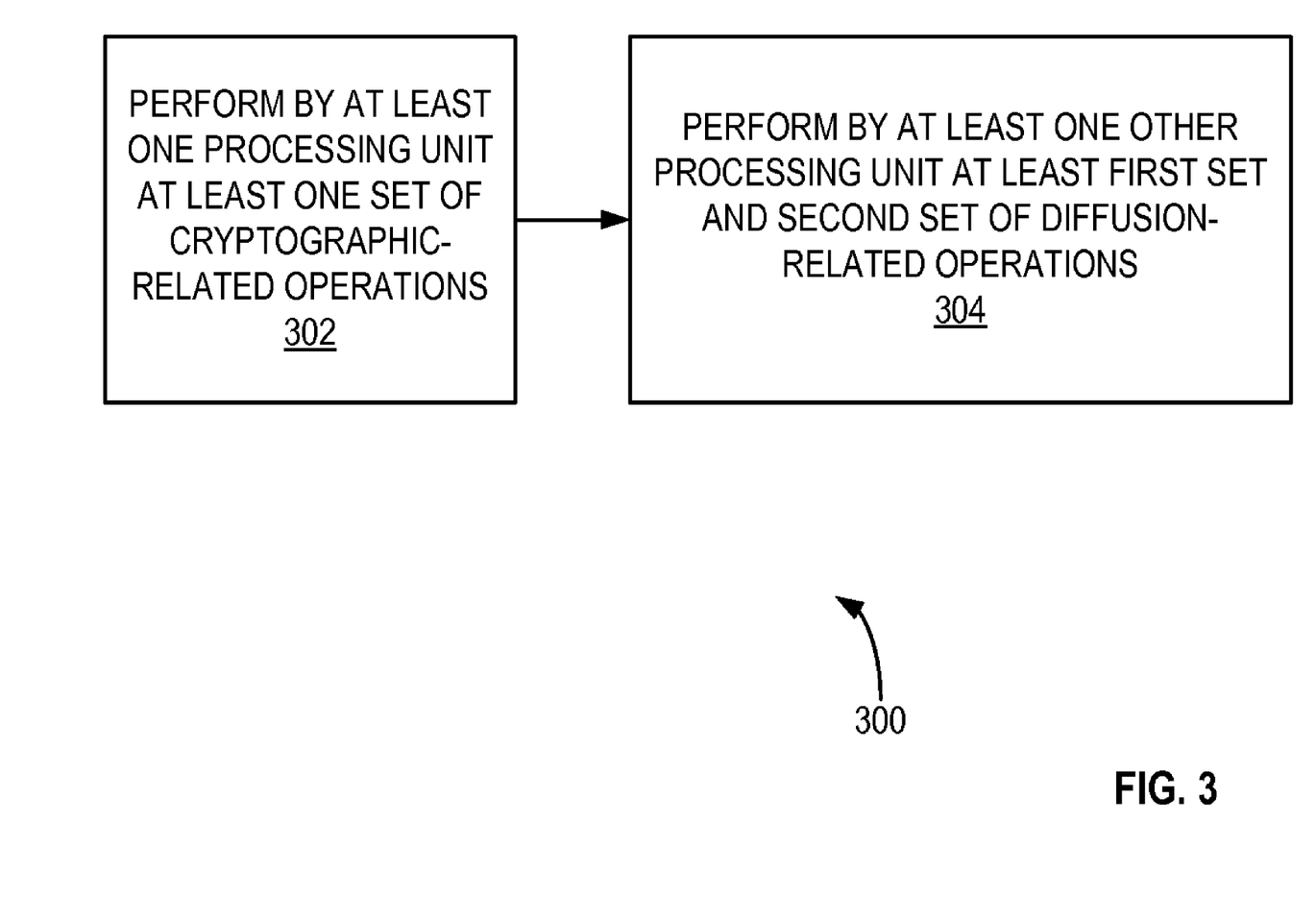
FIG. 3 is a flowchart illustrating operations in an embodiment.

With reference now being made to FIGS. 1 to 3, operations 300 that may be performed in system 100 will be described. After, for example, a reset of system 100, as a result, at least in part, of a request issued by the human user (not shown) to one or more nodes 10 via the not shown user interface system, circuitry 118 may generate and issue to mass storage 28 a request to access one or more blocks of data (e.g., one or more cipher text data blocks ("CTB" in FIG. 1) 40). As used in this embodiment, "accessing" data may comprise one or more operations that involve and/or manipulate data, such as, for example, reading and/or writing data. Also as used in this embodiment, a "block" of data may comprise one or more portions of data, such as, for example, one or more fixed and/or pre-defined length and/or sized segments and/or units of data. In this embodiment, the one or more data blocks 40 may correspond to (e.g., be or comprise) one or more sectors 30 stored in mass storage 28.

As stored in mass storage 28, one or more sectors 30 of data (and therefore, also one or more cipher text data blocks 40) may be or comprise cipher text resulting from diffusion and other cryptographic operations implemented in (or as part of) the encryption algorithm described in, for example, Section 4 of the whitepaper: Ferguson, "AES-CBC+Elephant Diffuser: A Disk Encryption Algorithm For Windows Vista," Microsoft Corporation, August 2006 (hereinafter, "the Ferguson whitepaper"). More specifically, in this embodiment, these diffusion and other cryptographic operations may comprise, for example, performing an exclusive-or operation involving, as operands, one or more initial plaintext data blocks ("PTDB" in FIG. 1) 32 and a sector key, to generate thereby one or more resulting encrypted data blocks ("EDB" in FIG. 1) 34. As is described in the Ferguson whitepaper, this sector key may be generated based upon an initial 512 bit key. The one or more encrypted data blocks 34 then may undergo a first set of diffusion-related operations (referred to as the "A diffuser" in the Ferguson whitepaper) to produce one or more resulting diffused encrypted data blocks ("DEDB" in FIG. 1) 36. The one or more diffused encrypted data blocks 36 then may undergo a second set of diffusion-related operations (referred to as the "B diffuser" in the Ferguson whitepaper) to produce one or more resulting diffused encrypted data blocks 38. The one or more diffused encrypted data blocks 38 then may undergo encryption that is compatible with Cipher Block Chaining (CBC) mode of operation of the Advanced Encryption Standard (AES), Federal Information Processing Standards Publication 197, National Institute of Standards and Technology (NIST), Nov. 26, 2001, and the results thereof may be stored in mass storage 28 as one or more sectors 30.

As used herein, a "diffusion-related operation" contemplates one or more operations comprised in, facilitating, and/or resulting in, at least in part, diffusion of data, and/or inverse operations thereof, e.g., for reversing, at least in part, such diffusion, and/or reconverting, at least in part, diffused data into non-diffused data, at least in part. Also as used herein, a "cryptographic-related operation" contemplates one or more operations comprised in, facilitating, and/or resulting in, at least in part, generation of cipher text from plaintext and/or generation, at least in part, of plaintext from cipher text. As used herein, "plaintext" may include data that is at least in part encrypted and/or diffused, and/or has already undergone and/or is presently undergoing one or more diffusion-related and/or cryptographic-related operations.

As stated previously, one or more data blocks 40 may correspond to one or more sectors 30. In response to the access request issued from the circuitry 118, mass storage 28 may retrieve from one or more sectors 30 and transmit to circuitry 118 one or more data blocks 40. Prior to presentation to one or more application programs (not shown) that may be executed by, for example, one or more processors 12 and/or resident in memory 21, integrated circuit 50 may perform diffusion-related and cryptographic operations on one or more data blocks 40 to reconvert one or more cipher text data blocks 40 into one or more plaintext data blocks 32, and such reconversion, one or more data blocks 32 may be stored, at least in part, in memory 21 for presentation and/or use by, at least in part, these one or more application programs and/or one or more processors 12.

More specifically, after receipt by one or more nodes 10 of one or more data blocks 40, one or more cores 102 may store in memory 104 one or more data blocks 40. In this embodiment, memory 104 may be shared, at least in part, between or among one or more cores 102 and/or one or more of the processing units 106, 108, . . . 110, and therefore, may be accessible by, at least in part, one or more cores 102 and/or one or more of the processing units. Alternatively or additionally, memory 120, 122, and/or 124 may be shared, at least in part, between or among one or more cores 102 and/or one or more of the processing units 106, 108, . . . 110, and therefore, may be accessible by, at least in part, one or more cores 102 and/or one or more of the respective processing units that do not respectively comprise memory 120, 122, and/or 124, respectively; in this case, the one or more data blocks 40 may be stored, at least in part, in one or more of the memories 120, 122, and/or 124.

After the one or more data blocks 40 have been stored, at least in part, in memory 104, 120, 122, and/or 124, circuitry (e.g., circuitry 134) in at least one processing unit (e.g., processing unit 110) may perform, at least one set of cryptographic-related operations on the one or more data blocks 40 to produce one or more data blocks 38 (see operation 302 in FIG. 3). This at least one set of cryptographic-related operations may be compatible with CBC mode of operation of AES. After circuitry 134 has produced one or more resulting data blocks 38 from one or more data blocks 40, circuitry 134 and/or one or more cores 102 may store, at least in part, one or more data blocks 38 in memory 104 and/or memory 124.

Thereafter, the circuitry 130 in at least one processing unit (e.g., processing unit 106) may perform at least a first set of diffusion-related operations on one or more data blocks 38 to produce one or more resulting data blocks 36, and also may perform at least a second set of diffusion-related operations on one or more data blocks 36 to produce one or more resulting data blocks 34 (See operation 304 in FIG. 3). As is shown in FIG. 2, in this embodiment, circuitry 130 may comprise a plurality of stages, including at least one stage 207, at least one other stage 209, at least one third stage 236, and at least one fourth stage 246. In this embodiment, a "stage" may be or comprise circuitry that receives one or more inputs, and generates, at least in part, based at least in part upon such one or more inputs, one or more outputs. Circuitry 130 also may include control circuitry 202.

In this embodiment, circuitry 130 may be capable of performing either a first set or second set of diffusion-related operations, depending upon the control signals and/or operands/data words provided to the stages. That is, control circuitry 202 may provide appropriate control signals, for example, to memory 104, 120, 122, and/or 124, and to at least stages 207, 236 that may result in (1) appropriate operands/data words being input to arithmetic and logical operations performed in stages 209, 246, and (2) an appropriate number of iterations (e.g., "rounds") of such operations being performed to result in the circuitry 130 first performing on the one or more data blocks 38 a first set of diffusion-related operations to produce the one or more data blocks 36, and thereafter, the circuitry 130 performing on the one or more blocks 36 a second set of diffusion-related operations to produce the one or more data blocks 34. The respective arithmetic and logical operations performed by and/or involved in the at least one other stage 209 and/or the fourth stage 246 may be common to both the first set and the second set of diffusion-related operations; however, the first and second sets of diffusion-related operations (e.g., as performed by at least one processing unit 106), and the at least one set cryptographic-related operations (e.g., as performed by at least one processing unit 110), respectively, may be different from each other, at least in part.

For example, in this embodiment, at least one stage 207 may select, based at least in part upon one or more control signals provided from control circuitry 202 to multiplexer circuitry 204, 206 in at least one stage 207, between respective first and second sets of operands/data words 214, 216 input to at least one stage 207. More specifically, in this embodiment, the operands/data words 214, 216 may comprise first operands and second operands respectively associated with a first set of diffusion-related operations (which may, in this example of decrypting the one or more data blocks 38, involve diffusion-related operations to reverse the "B" diffuser referred to in the Ferguson whitepaper) and a second set of diffusion-related operations (which may, in this example, involve diffusion-related operations to reverse the "A" diffuser referred to in the Ferguson whitepaper), respectively. In this example, memory 120 may comprise one or more queues (not shown) that may store these sets of operands (and other operands and/or data words described later that are used by circuitry 130) in 128-bit wide registers, and appropriate control signals may be provided to memory 120 by control circuitry 202 to result in memory 120 providing these operands and data words to circuitry 130 so as to permit these sets of diffusion-related operations to be performed.

Similarly, in this embodiment, at least one third stage 236 may select, based at least in part upon one or more control signals provided from control circuitry 202 to multiplexer circuitry 233, 234 in at least one third stage 236, between respective third and fourth sets of operands/data words 230, 232 input to at least one third stage 236. More specifically, in this embodiment, the operands/data words 230, 232 may comprise third operands and fourth operands respectively associated with this first set of diffusion-related operations (which may, in this example of decrypting the one or more data blocks 38, involve diffusion-related operations to reverse the "B" diffuser referred to in the Ferguson whitepaper) and this second set of diffusion-related operations (which may, in this example, involve diffusion-related operations to reverse the "A" diffuser referred to in the Ferguson whitepaper), respectively. In this example, memory 120 may comprise one or more queues (not shown) that may store these sets of operands (and other operands and/or data words described later that are used by circuitry 130) in 128-bit wide registers, and appropriate control signals may be provided to memory 120 by control circuitry 202 to result in memory 120 providing these operands and data words to circuitry 130 so as to permit these sets of diffusion-related operations to be performed.

The A and B diffusers of the Ferguson whitepaper and their inverse operations (and therefore also the first and second sets of diffusion-related operations in this embodiment) interpret the data contained in the one or more data blocks 38 and 36 as respective arrays of 32-bit data words. If the first set of diffusion-related operations involves operations to reverse the B diffuser referred to in the Ferguson whitepaper, then these data words in the one or more data blocks input to the circuitry 130 may be processed by circuitry 130 in a plurality of iterations in accordance with the following diffusion equation (B):

For i=0 to 2, i an integer, $d(i)=d(i)+[d(i+2)xor(d(i+5)<<<Rb[i \bmod 4])]$, where d(i) is the $i^{th}$ data word comprised in the one or more data blocks being processed, xor is the logical exclusive-or function, Rb is defined as [0, 10, 0, 25], and <<<denotes the logical rotate left function. The preceding equation is well known to those skilled in the art, and its use and operation are described in detail, for example, in the Ferguson article.

Conversely, if the second set of diffusion-related operations involve operations to reverse the A diffuser referred to in the Ferguson whitepaper, then the data words in the one or more data blocks 36 may be processed by circuitry 130 in a plurality of iterations in accordance with the following diffusion equation (A):

For i=0 to 4, i an integer, $$d(i)=d(i)+[d(i-2)\text{xor}(d(i-5)<<<Ra[i \bmod 4])], \text{ where}$$

d(i) is the $i^{th}$ data word comprised in the one or more data blocks being processed, xor is the logical exclusive-or function, Ra is defined as [9, 0, 13, 0], and <<< denotes the logical rotate left function. Negative index values are taken as wrapping around to data words at the end of one or more data blocks. The preceding equation is well known to those skilled in the art, and its use and operation are described in detail, for example, in the Ferguson article.

As stated previously, memory 120, 104, 122, and/or 124 may store one or more blocks 38. During processing of the one or more blocks 38 by circuitry 130, data words within the one or more blocks 38 as stored in memory 120, 104, 122, and/or 124 may be overwritten as the one or more blocks 38 are being converted into one or more blocks 36. Similarly, during processing of the one or more blocks 36 by circuitry 130, data words within the one or more blocks 36 may be overwritten as the one or more blocks 36 are being converted into one or more blocks 34. Thus, during the processing of the one or more blocks 36, 38 by circuitry 130, the respective data words specified by the above equations may be input, as respective first, second, third, and fourth operands (and other operands/data words) described herein, on the basis that single array of data words stored in memory is used, wherein the array initially comprises one or more blocks 38, the array is overwritten by circuitry 130 to produce, as the array, one or more blocks 36, the array is then further overwritten by circuitry 130 to produce, as the array, one or more blocks 34. The first and second operands may be contemporaneously provided as inputs to at least one stage 207, and the third and fourth operands may be contemporaneously provided as inputs to at least one stage 236, respectively.

In this embodiment, during each respective processing cycle, two respective data words may be produced from the one or more data blocks being processed and may be used in overwriting portions of the one or more data blocks in accordance with the above. One of these data words may be output as operand/data word 224 from stage 209, and the other of these data words may be output as operand/data word 248 from stage 246. In this embodiment, in view of data dependencies that arise, e.g., from the above equations, the respective data words intended to be overwritten in the one or more data blocks by the data words 224 and 248 may be separated by one data word with respect to each other; for example, if data word 224 is intended to overwrite the first data word, i.e., d(1), in the one or more data blocks, then data word 248 may overwrite the third data word, i.e., d(3), in the one or more data blocks, and the operands input to circuitry 130 may be selected accordingly to satisfy the above equations.

For example, in single respective processing cycle wherein stage 209 is intended to output the data word to replace d(1) in the one or more data blocks, operands/data words 214, 216 may comprise, as a subset of the first operands associated with the first set of diffusion-related operations (in this example, the inverse B diffuser), a sixth data word in the one or more data blocks rotated (e.g., by the number of bits specified by the element in the Rb matrix whose index is equal to 1 mod 4, i.e., by 10 bits) and the third data word comprised in the one or more data blocks. In order to carry out such rotation operations, circuitry 130 (and/or components thereof, e.g., the multiplexers) may comprise not shown rotator and/or shift circuitry. This subset of the first operands may undergo an exclusive-or operation by XOR circuitry 208, and the output of this exclusive-or operation may then be added by addition circuitry 220 to another subset 218 of the first operands. In this example, this other subset may be the first data word in the one or more data blocks, as specified by equation (B) above. The output 222 of addition circuitry 220 may be operand/data word 224, and circuitry 202 may overwrite the first data word, i.e., d(1) in the one or more data blocks, with data word 224.

Also in this single respective cycle, stage 246 may be intended to output the data word to replace d(3) in the one or more data blocks, and operands/data words 230, 232 may comprise, as a subset of the third operands associated with the first set of diffusion-related operations (in this example, the inverse B diffuser), an eighth data word in the one or more data blocks rotated (e.g., by the number of bits specified by the element in the Rb matrix whose index is equal to 3 mod 4, i.e., by 25 bits) and the fifth data word comprised in the one or more data blocks. This subset of the third operands may undergo an exclusive-or operation by XOR circuitry 240, and the output of this exclusive-or operation may then be added by addition circuitry 244 to another subset 242 of the third operands. In this example, this other subset may be the third data word in the one or more data blocks, as specified by equation (B) above. The output 247 of addition circuitry 244 may be operand/data word 248, and circuitry 202 may overwrite the third data word, i.e., d(3) in the one or more data blocks, with data word 248.

The above process may be continued by circuitry 130, through multiple iterations and the values of i, in accordance with the above teachings and the algorithm in the Ferguson whitepaper, so as to produce one or more data blocks 36. Thereafter, for example, in a single subsequent respective cycle, wherein stage 209 is intended to output the data word to replace d(9) in the one or more data blocks, operands/data words 214, 216 may comprise, as a subset of the second operands associated with the second set of diffusion-related operations (in this example, the inverse A diffuser), a seventh data word in the one or more data blocks and the fourth data word comprised in the one or more data blocks. This subset of the second operands may undergo an exclusive-or operation by XOR circuitry 208, and the output of this exclusive-or operation may then be added by addition circuitry 220 to another subset 218 of the second operands. In this example, this other subset may be the ninth data word, i.e., d(9), in the one or more data blocks, as specified by equation (A) above. The output 222 of addition circuitry 220 may be operand/data word 224, and circuitry 202 may overwrite the ninth data word, i.e., d(9) in the one or more data blocks, with data word 224.

Also in this single respective cycle, stage 246 may be intended to output the data word to replace d(11) in the one or more data blocks, and operands/data words 230, 232 may comprise, as a subset of the fourth operands associated with the second set of diffusion-related operations (in this example, the inverse A diffuser), a sixth data word in the one or more data blocks and the ninth data word (as overwritten by data word 224) comprised in the one or more data blocks. This subset of the fourth operands may undergo an exclusive-or operation by XOR circuitry 240, and the output of this exclusive-or operation may then be added by addition circuitry 244 to another subset 242 of the fourth operands. In this example, this other subset may be the eleventh data word in the one or more data blocks, as specified by equation (A) above. The output 246 of addition circuitry 244 may be operand/data word 248, and circuitry 202 may overwrite the eleventh data word, i.e., d(11) in the one or more data blocks, with data word 248.

The above process may be continued by circuitry 130, through multiple iterations and the values of i, in accordance with the above teachings and the algorithm in the Ferguson whitepaper, so as to produce one or more data blocks 34. Thereafter, circuitry 132 and/or one or more cores 102 may store, at least in part, one or more data blocks 34 in memory 104 and/or memory 122. Thereafter, circuitry 132 in at least one processing unit 108 may perform one or more decryption operations based at least in part upon the sector key to produce one or more plaintext data blocks 32 from one or more data blocks 34. Circuitry 132, one or more cores 102, and/or one or more processors 12 then may store, at least in part, one or more data blocks 32 in memory 21 and/or memory 104 for use by and/or presentation to one or more processors 12 and/or the one or more application programs.

In this embodiment, each of the stages 207, 209, 236, and 246 may be embodied entirely or almost entirely in hardware. Alternatively, however, one or more of these stages may instead be embodied in whole or in part in software and/or in other forms (e.g., firmware, etc.) without departing from this embodiment. Additionally or alternatively, control circuitry 202 may be implemented in whole or in part as state machine circuitry, however, many alternatives are possible without departing from this embodiment.

In this embodiment, the data path through circuitry 130 (and/or components thereof) may be 64-bits or 128-bits wide (depending upon, for example, cycle time and/or area constraints), thereby allowing multiple (e.g., two or four, respectively) 32-bit data words to be processed per processing cycle. Advantageously, this may enhance the processing throughput of circuitry 130.

In this embodiment, one or more processing units 108 and/or 110, memory 104, and/or one or more cores 102 may have respective constructions and/or operations generally in accordance with the teachings disclosed in, e.g., commonly-assigned co-pending U.S. patent application Ser. No. 11/354, 404, filed Feb. 14, 2006, and published on Aug. 16, 2007, as U.S. patent application Publication, Feghali et al., Publication No. U.S. 2007/0192547. Of course, without departing from the embodiment, the respective constructions and/or operations of one or more processing units 108 and/or 110, memory 104, and/or one or more cores 102 may differ in whole or in part from each other and/or from the aforesaid teachings. Additionally or alternatively, without departing from this embodiment, some of all of the respective circuitry and/or functionality of processing units 106, 108, . . . 110, memory 104, and/or one or more cores 102 may be comprised in one or more other respective processing units and/or cores.

As will be appreciated by those skilled in the art, although circuitry 130 has been described herein as being capable of processing one or more blocks 38 to produce one or more blocks 34 and/or one or more blocks 36, it will be appreciated that circuitry 130 may be alternatively or additionally modified in ways apparent to those skilled in the art, in accordance with the techniques of this embodiment, to process one or more blocks 34 to produce one or more blocks 36 and/or 38. Likewise, circuitry 132 may alternatively or additionally be capable of processing one or more blocks 32 to produce one or more blocks 34, and/or circuitry 134 may be alternatively or additionally capable of processing one or more blocks 38 to produce one or more blocks 40. Thus, in such an alternative or additional arrangement, the order of operations 300 may be reversed, e.g., operation 304 may precede 302. This embodiment is intended to embrace all such alternatives, modifications, and variations.

Thus, an embodiment includes at least one processing unit to perform at least first and second sets of diffusion-related operations to produce a resulting block from a data block, and that includes at least one stage and at least one other stage. The at least one stage is to select one of first operands and second operands input to the at least one other stage. The first and second operands are respectively associated with the first and second sets of operations, respectively. The at least one other stage involves arithmetic and logical operations common to both the first and second sets of operations. At least one other processing unit is to perform at least one set of cryptographic-related operations (different, at least in part, from the first and second sets of operations) on at least one of (1) another block to produce the data block and (2) the resulting block.

Thus, in this embodiment, the at least one other stage (e.g., stage 209 and/or stage 246) may comprise arithmetic and logical operations that may be common (e.g., common XOR and addition operations, such as are performed by XOR circuitry 208 and addition circuitry 220 in stage 209, and XOR circuitry 240 and addition circuitry 244 in stage 246, respectively) to both the first set and the second set of diffusion-related operations. Advantageously, this may permit the same at least one stage to be used in carrying out either or both of the first and second sets of diffusion-related operations. Also advantageously, this embodiment may be able to generate a plurality of data words during each respective processing cycle to overwrite portions of the one or more data blocks being processed, thereby increasing the speed and efficiency with which such processing can be carried out compared to the prior art. Additionally, this embodiment is amenable to implementation entirely or substantially entirely in dedicated hardware; advantageously, this may permit processing of the one or more data blocks to be carried out faster and more efficiently than may be possible by prior art processing performed in whole or substantial part by software and/or general purpose hardware.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Indeed, without departing from this embodiment, system 100 may include more or fewer than the elements shown in the Figures and described previously herein as being comprised system 100. Accordingly, the claims are intended to cover all such equivalents.

What is claimed is:

1. Circuitry comprising:
   at least one processing unit to perform at least a first set of diffusion-related operations and a second set of diffusion-related operations to produce a resulting block from a data block, the at least one processing unit including at least one stage and at least one other stage, the at least one stage being to select one of first operands and second operands to be input to the at least one other stage, the first operands and the second operands being respectively associated with the first set and the second set of diffusion-related operations, respectively, the at least one other stage involving arithmetic and logical operations common to both the first set and the second set of diffusion-related operations, the at least one other stage being capable of carrying out the first and second sets of diffusion-related operations, as selected, based at least in part upon control signals provided to the at least one stage;

the at least one other stage being capable of outputting, during a respective processing cycle of the at least one other stage, respective data words produced based at least in part upon the data block, the respective data words being to overwrite respective portions of the data block;

at least one other processing unit to perform at least one set of cryptographic-related operations on at least one of (1) another block to produce the data block and (2) the resulting block, the at least one set of cryptographic-related operations being different, at least in part, from the first set and the second set;

an integrated circuit chip comprising the at least one processing unit and the at least one other processing unit, the integrated circuit chip also comprising at least one processor core and memory, the memory to be shared, at least in part, among the at least one processor core, the at least one processing unit, and the at least one other processing unit, the memory also to store the data block, the resulting block, and the another block; and at least one host microprocessor and another memory, the at least one host microprocessor to store the resulting block in the another memory for use by the at least one host microprocessor and one or more application programs, the one or more application programs being executed by the at least one host microprocessor and being resident in the another memory.

2. The circuitry of claim 1, wherein:
the circuitry is coupled to mass storage; and
the another block comprises a sector from the mass storage.

3. The circuitry of claim 1, wherein:
the at least one processing unit comprises a third stage to select one of third operands and fourth operands to be input to a fourth stage, the third operands being associated with the first set of diffusion-related operations, the fourth operands being associated with the second set of diffusion-related operations.

4. The circuitry of claim 1, wherein:
the arithmetic and logical operations comprise (a) an exclusive-or involving a subset of the one of the first and second operands, and (b) an addition involving an output of the exclusive-or and another subset of the one of the first and second operands.

5. A method carried out at least in part by circuitry, the method comprising:
performing by at least one processing unit at least a first set of diffusion-related operations and a second set of diffusion-related operations to produce a resulting block from a data block, the at least one processing unit including at least one stage and at least one other stage, the at least one stage being to select one of first operands and second operands to be input to the at least one other stage, the first operands and the second operands being respectively associated with the first set and the second set of diffusion-related operations, respectively, the at least one other stage involving arithmetic and logical operations common to both the first set and the second set of diffusion-related operations, the at least one other stage being capable of carrying out the first and second sets of diffusion-related operations, as selected, based at least in part upon control signals provided to the at least one stage;

the at least one other stage being capable of outputting, during a respective processing cycle of the at least one other stage, respective data words produced based at least in part upon the data block, the respective data words being to overwrite respective portions of the data block; and performing by at least one other processing unit at least one set of cryptographic-related operations on at least one of (1) another block to produce the data block and (2) the resulting block, the at least one set of cryptographic-related operations being different, at least in part, from the first set and the second set;

the circuitry comprising an integrated circuit chip that comprises the at least one processing unit and the at least one other processing unit, the integrated circuit chip also comprising at least one processor core and memory, the memory to be shared, at least in part, among the at least one processor core, the at least one processing unit, and the at least one other processing unit, the memory also to store the data block, the resulting block, and the another block;

the circuitry also comprising at least one host microprocessor and another memory, the at least one host microprocessor to store the resulting block in the another memory for use by the at least one host microprocessor and one or more application programs, the one or more application programs being executed by the at least one host microprocessor and being resident in the another memory.

6. The method of claim 5, wherein:
the circuitry is coupled to mass storage; and
the another block comprises a sector from the mass storage.

7. The method of claim 5, wherein:
the at least one processing unit comprises a third stage to select one of third operands and fourth operands to be input to a fourth stage, the third operands being associated with the first set of diffusion-related operations, the fourth operands being associated with the second set of diffusion-related operations.

8. The method of claim 5, wherein:
the arithmetic and logical operations comprise (a) an exclusive-or involving a subset of the one of the first and second operands, and (b) an addition involving an output of the exclusive-or and another subset of the one of the first and second operands.

9. Computer-readable memory storing one or more instructions that when executed by a machine result in execution of operations comprising:
performing by at least one processing unit at least a first set of diffusion-related operations and a second set of diffusion-related operations to produce a resulting block from a data block, the at least one processing unit including at least one stage and at least one other stage, the at least one stage being to select one of first operands and second operands to be input to the at least one other stage, the first operands and the second operands being respectively associated with the first set and the second set of diffusion-related operations, respectively, the at least one other stage involving arithmetic and logical operations common to both the first set and the second set of diffusion-related operations, the at least one other stage being capable of carrying out the first and second sets of diffusion-related operations, as selected, based at least in part upon control signals provided to the at least one stage;

the at least one other stage being capable of outputting, during a respective processing cycle of the at least one other stage, respective data words produced based at least in part upon the data block, the respective data words being to overwrite respective portions of the data block; and performing by at least one other processing unit at least one set of cryptographic-related operations on at least one of (1) another block to produce the data block and (2) the resulting block, the at least one set of cryptographic-related operations being different, at least in part, from the first set and the second set;

wherein an integrated circuit chip comprises the at least one processing unit and the at least one other processing unit, the integrated circuit chip also comprising at least one processor core and memory, the memory to be shared, at least in part, among the at least one processor core, the at least one processing unit, and the at least one other processing unit, the memory also to store the data block, the resulting block, and the another block;

also wherein the circuitry comprises at least one host microprocessor and another memory, the at least one host microprocessor to store the resulting block in the another memory for use by the at least one host microprocessor and one or more application programs, the one or more application programs being executed by the at least one host microprocessor and being resident in the another memory.

10. The memory of claim 9, wherein:

the circuitry is coupled to mass storage; and the another block comprises a sector from the mass storage.

11. The memory of claim 9, wherein:

the at least one processing unit comprises a third stage to select one of third operands and fourth operands to be input to a fourth stage, the third operands being associated with the first set of diffusion-related operations, the fourth operands being associated with the second set of diffusion-related operations.

12. The memory of claim 9, wherein:

the arithmetic and logical operations comprise (a) an exclusive-or involving a subset of the one of the first and second operands, and (b) an addition involving an output of the exclusive-or and another subset of the one of the first and second operands.

* * * * *